(12) United States Patent
Grey et al.

(10) Patent No.: US 12,205,176 B2
(45) Date of Patent: Jan. 21, 2025

(54) DYNAMIC COMPUTING SYSTEM, METHOD AND PROCESS

(71) Applicant: Skylab USA, Carlsbad, CA (US)

(72) Inventors: Dean Grey, Encinitas, CA (US); Leopoldo Alcala, San Marcos, CA (US)

( * ) Notice: Subject to any disclaimer, the term of this patent is extended or adjusted under 35 U.S.C. 154(b) by 1064 days.

(21) Appl. No.: 15/948,109

(22) Filed: Apr. 9, 2018

(65) Prior Publication Data
US 2018/0293668 A1    Oct. 11, 2018

Related U.S. Application Data

(60) Provisional application No. 62/483,292, filed on Apr. 7, 2017.

(51) Int. Cl.
*G06Q 50/00* (2024.01)
*G06F 8/35* (2018.01)
*G06F 8/41* (2018.01)
*G06F 8/60* (2018.01)
*G06F 8/71* (2018.01)

(52) U.S. Cl.
CPC .............. *G06Q 50/01* (2013.01); *G06F 8/35* (2013.01); *G06F 8/60* (2013.01); *G06F 8/71* (2013.01); *G06F 8/41* (2013.01)

(58) Field of Classification Search
None
See application file for complete search history.

(56) References Cited

U.S. PATENT DOCUMENTS

| | | | | |
|---|---|---|---|---|
| 2008/0307320 | A1* | 12/2008 | Payne | G06F 3/0481 715/751 |
| 2012/0311462 | A1* | 12/2012 | Devecka | G06Q 30/0255 715/753 |
| 2015/0135160 | A1* | 5/2015 | Gauvin | G06F 8/34 717/109 |
| 2016/0224337 | A1* | 8/2016 | Xia | G06F 8/71 |
| 2016/0246592 | A1* | 8/2016 | Jamjoom | G06F 8/70 |
| 2017/0115968 | A1* | 4/2017 | Fukala | G06F 16/252 |

* cited by examiner

*Primary Examiner* — Andrew B Whitaker
(74) *Attorney, Agent, or Firm* — Ferguson Braswell Fraser Kubasta PC

(57) ABSTRACT

The system provides a method and process to automatically create a custom gamified social net platform using different modular features. The social networking platform created will be able to run natively on multiple operating systems. Any changes will be reflected in every version of the social networking platform, allowing for easy updates on multiple types of devices. Owners will also be able to create custom badges to engage their users that are awarded after actions are performed as part of a Value Reinforcement System. Owners may also apply specific "smart tags", some of which will be self-applied by users when they register for the platform, while others will be generated by the user's actions and interests as the user uses the platform. An owner may use these smart tags to determine the type of content users can view or to contact specific users.

11 Claims, 7 Drawing Sheets

DYNAMIC COMPUTING SYSTEM, METHOD AND PROCESS

This patent application claims priority to U.S. Provisional Patent Application No. 62/483,292 filed on Apr. 7, 2017, which is incorporated by reference herein, in its entirety.

BACKGROUND OF THE SYSTEM

Social networks are essential for companies to interact and advertise to their customer base or intended audience. Currently, companies need to either create pages on existing social networks that provide limited control and customization or they must spend significant amounts of money to build a customized social networking platform for their business. Even with a page on an existing social network or a personal social networking platform, there is no guarantee that customers will remain engaged with the social networking platform or view every message sent by the company.

SUMMARY

The system in an embodiment allows a company, or platform owner ("owner"), to engage their target audience by providing a method and process to automatically create a branded or white-labeled, gamified social networking platform. By using different modular features to create a custom social networking platform, an owner can easily interact and engage with their customers, audience or users. The social networking platform created will run natively on multiple operating systems, for example iOS and Android, and as a web application on an internet browser. The system allows an owner to easily create or customize their social networking platform to fit their needs and the needs of their users. Any change made by the owner will be reflected in every version of the social networking platform in real time, allowing for easy updates of the platform on multiple types of devices.

In order to keep the users engaged owners will also be able to create custom badges or achievements, which are provided to the users once they perform a specific action as part of a Value Reinforcement System (VRS). These custom badges can be created in real time. Rewards, such as promotional codes, may be tied to the custom badge and provided to the user once they obtain the badge. Users may also be featured in a leaderboard based on the actions they take and have their activity posted on a publicly accessible social recognition wall. These features allow an owner to promote the actions that should be performed by the users and reinforce the benefit of those actions using the VRS.

Owners may also apply specific "smart tags" to users on the social networking platform. Some of these smart tags will be self-applied by users when they register for the platform, while others will be generated by the user's actions and interests as the user uses the platform. The tags may be dynamically generated based on the user's location, the user's identity, intents, interests, performance and behavior. An owner may then use these tags to interact and engage specific groups of users by sending targeted content or messages as a notification on the application. An owner may use these smart tags to determine the type of content users can view and/or access in the social networking platform. An owner may then use these tags to interact and engage specific groups of users by sending targeted content or messages as a notification on the application. Users may also communicate with each other on the platform via chat messages or comments on a user's activity or content on the platform.

DETAILED DESCRIPTION OF THE SYSTEM

The system provides a method and process for automatically generating social networking platforms. These social networking platforms and the applications that allow users to interact with the social networking platform are generated automatically for the owner after the owner selects modular features and options that are desirable for both the owner and the user's experiences with the social networking platform. In one embodiment, the system provides a method for an owner to create custom badges as part of a Value Reinforcement System and select specific actions to display on the front page of the application to promote specific behaviors by users. In one embodiment, the system also tags users with dynamically generated "smart tags" based on the user's location and actions. The system is described herein.

Overview of the Social Networking Platform Generated

Figure 1:
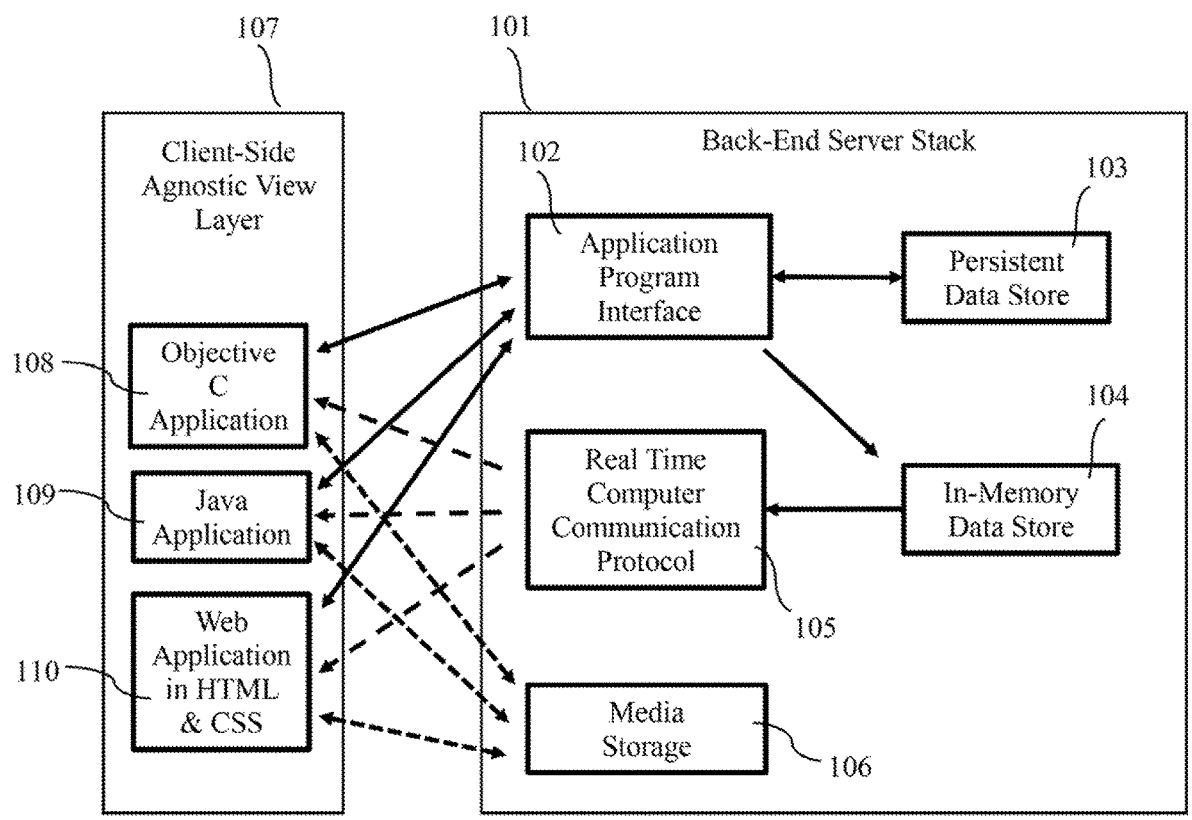
FIG. 1 is a flowchart depicting the front-end application and back-end server structure in one embodiment of the system.

In one embodiment, as seen in FIG. 1, the system creates a server back-end 101, and an agnostic view layer 107, which is how users primarily interact with the social networking platform. The server backend consists of several pans including an Application Program Interface (API) 102, which in one embodiment could be built in the python programming language, and is used to handle the business logic and access the various data stores of the social networking platform. The API 102, interacts with the Persistent Data Store 103, which in one embodiment could consist of an object relational database such as a PostgreSQL object database, which allows the owner or a user to obtain or store relevant data which is read by the API. If a user on the social networking platform calls for information on a page, the API 102 will find and read the relevant data in the Persistent Data Store 103, send it to the In-memory Data Store 104, where it is temporarily kept before being sent to the user's view layer 107 through the Real Time Computer Communication Protocol 105. In one embodiment, the Real Time Computer Communication Protocol 105 uses the WebSocket protocol. If the information requested by the user includes a media object, such as a video file, image file, or sound file, the user's application will obtain the relevant media object from the Media Storage 106, which in one embodiment consists of a cloud storage service. In one embodiment, the View Layer application used by the user to view the social networking platform could be an application written in Objective C 108, an application written in Java 109, or an application viewed in a web browser written in HTML, Javascript and CSS 110. All three applications contain the same content and features and are updated simultaneously. A user using any of the three applications should have the same experience regardless of the type of view layer application used. As users report their actions using the applications in the view layer 107, the API 102 updates the Persistent Data Store 103 with the new data as the users enter it. The Media Storage 106 also stores media objects uploaded by the users through the applications in the view layer 107. In one embodiment, all communications between the server back-end 101 and the view layer applications 107 are tokenized and encrypted to protect the data of the users.

Creating and Updating the Social Networking Platform

Figure 2:
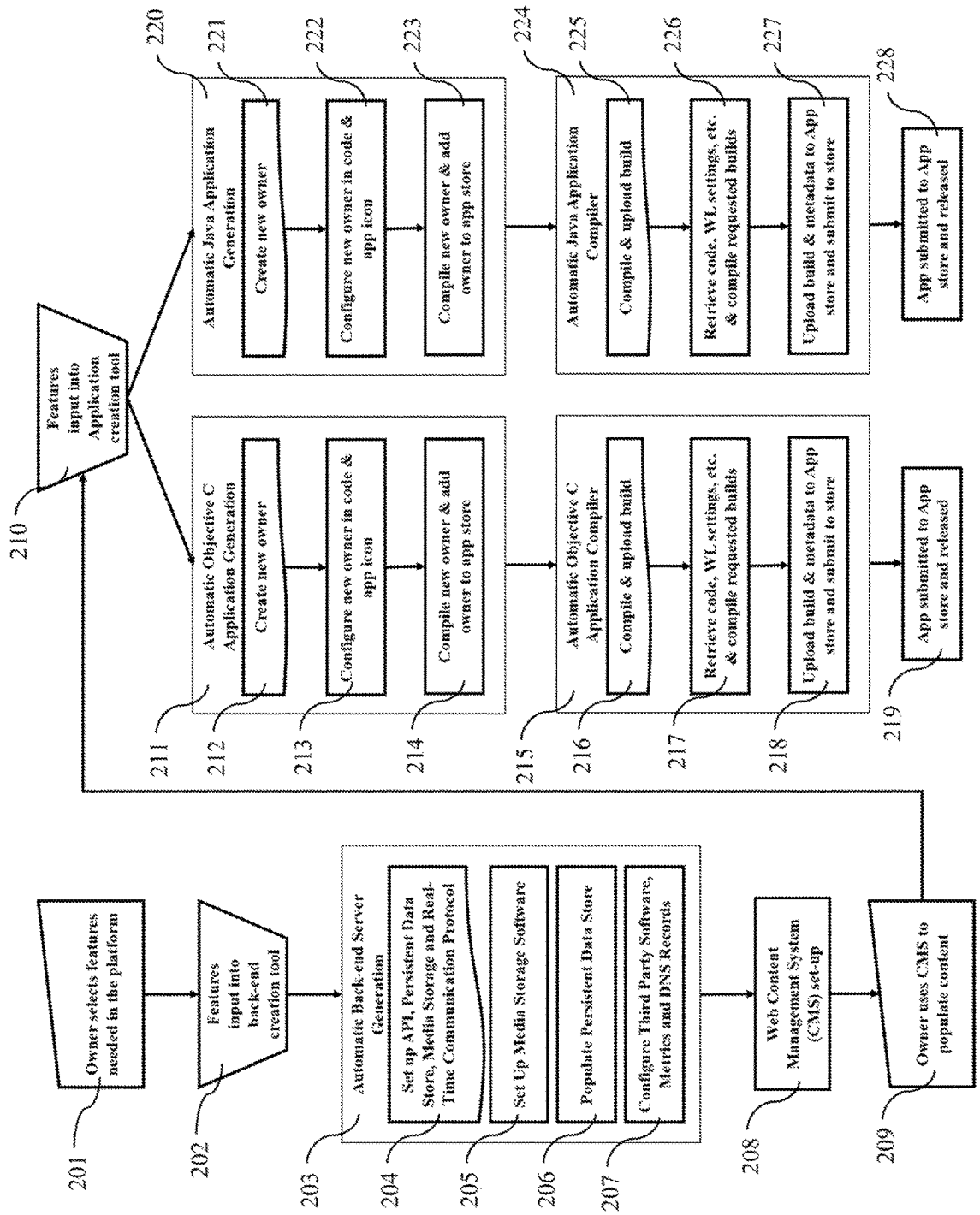
FIG. 2 is a flowchart depicting how the social networking platform and associated application are automatically generated in one embodiment of the system.

In one embodiment, the process of creating the social networking platform begins when the owner selects the features that are desired at step 201 as seen in FIG. 2. In one embodiment, these features are pre-made and can include changing the appearance of the application and any art assets; changing which features are available and the order they appear; modifying the navigation menus and action board; changing the branding and logos; changing the types of tags and smart tags available; selecting the ways that users can communicate and chat with each other; selecting which activities and actions are tracked and reported by users; selecting which actions are displayed on the front page of the application; changing how leaderboards are displayed and selected; changing how a user's profile page is displayed; selecting the kinds of media content available on the network; selecting the kind of training available to users; selecting the kinds of badges available; and selecting what kinds of contests will be available. These selections are entered into the Automatic Back-end Server Generator 203 at step 202.

The generator program then automatically generates the API 102, Persistent data store 103, Media Storage 106, and Real Time Communication Protocol 105 at step 204. In one embodiment, the generator program then sets up the software to access the media storage at step 205. Next, the generator program populates the persistent data store with template data at step 206. Finally, the generator program configures third party software, metric software and DNS records necessary to access the server at step 207. A web content management system (CMS) is generated at step 208. The owner then uses the CMS to populate the social networking platform with relevant content at step 209. These features and content are then used as a basis to create the applications by inputting the features into the Application creation tool at step 210.

In one embodiment, the Application tool then runs two separate processes on two separate servers simultaneously, an Automatic Objective C Application Generator 211, and an Automatic Java Application Generator 220. In this embodiment, both application generators create a new owner at step 212 and 221. Both application generators then configure new owners in the code and create an application icon at steps 213 and 222. The application generators then compile the new owner's profile and add the owner to the respective app stores for each application at steps 214 and 223. In this embodiment, after the applications are generated, the details about the build are sent to the Automatic Objective C Application Compiler 215 from the Automatic Objective C Application Generator 211, and to the Automatic Java Application Compiler 224 from the Automatic Java Application Generator 220. Both application compilers then compile and upload the build by retrieving the code, settings and other miscellaneous details and compile the requested builds at steps 217 and 226. The compilers then upload the build and metadata to the respective app stores and submit to the app store at steps 218 and 227. The apps are then released on their respective app stores at steps 219 and 228 simultaneously.

Figure 3:
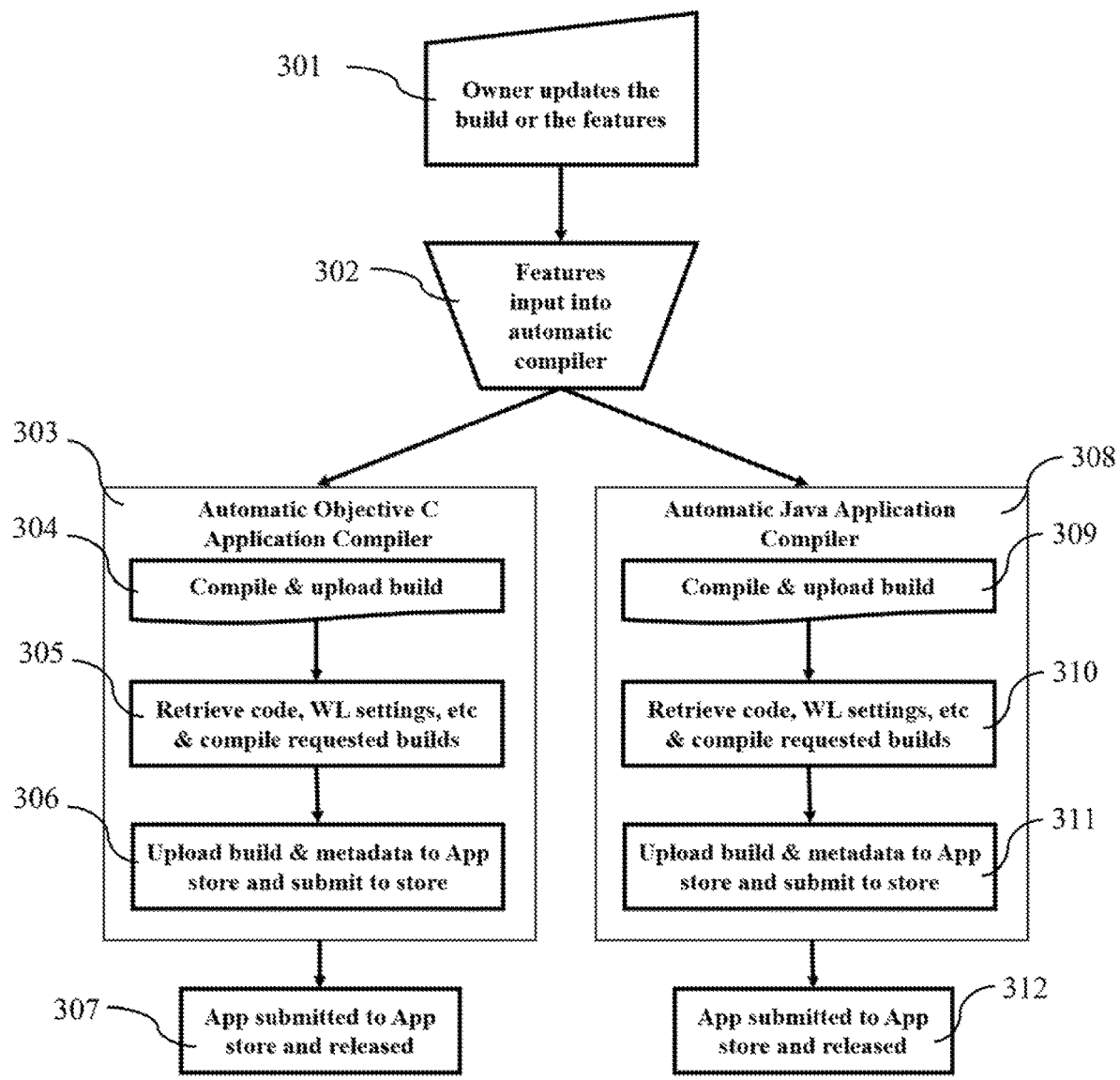
FIG. 3 is a flowchart depicting how the social networking platform and associated application are edited and automatically compiled in one embodiment of the system.

FIG. 3 depicts the process that occurs when an owner updates the features or build of the social networking platform in a similar embodiment. After the owner updates the build or the features of the social networking platform in step 301, the changes are then input into the automatic compiler at step 302. The automatic compiler then runs simultaneously on two separate servers, the Automatic Objective C Application Compiler 303 and the Automatic Java Application Compiler 308 then begin to compile the build at steps 304 and 309. The application compilers retrieve the code, setting, and other miscellaneous data to compile the requested builds at steps 305 and 310. The application compilers then upload the modified build and metadata to the respective app store and submit the application to the store at steps 306 and 311. The new modified apps are then released simultaneously on their respective stores at steps 307 and 312.

Example of a View Layer Application

Figure 4:
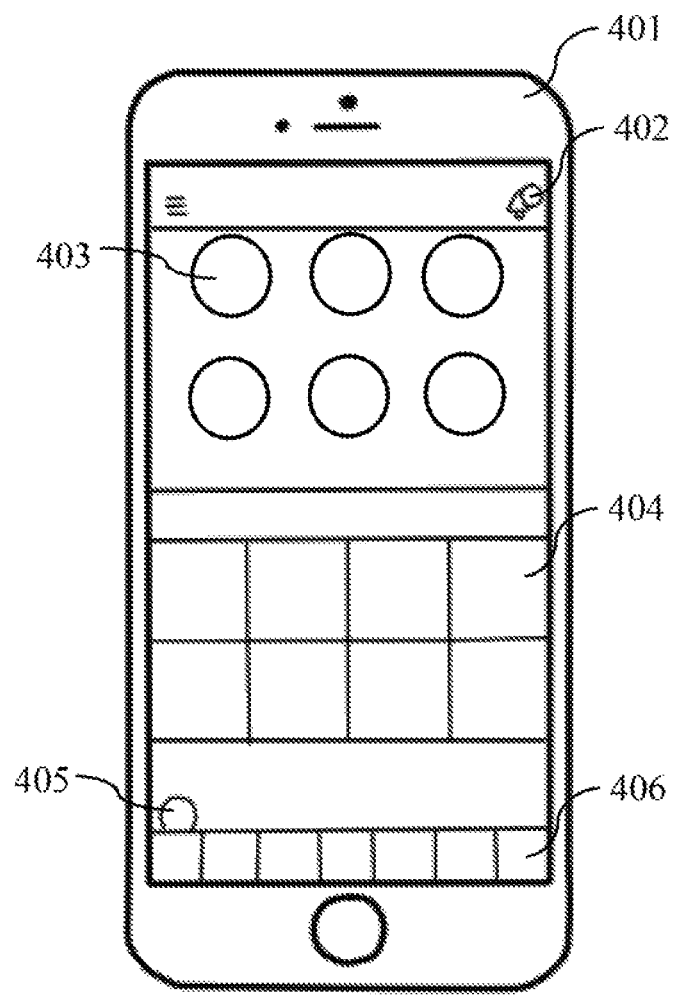
FIG. 4 is a depiction of the application used to access the social networking platform in one embodiment of the system.

FIG. 4 is an example of a view layer application to view the social network platform in one embodiment. The application may be viewed on a mobile computing device ("smartphone") 401, or on any device over an internet browser. The application should look and function identically no matter what device is used or what underlying computer language the program is written in. In one embodiment, the application has a notification system 402, which notifies the user about someone commenting on or approving the user's actions, or it can be used to notify the user when the owner sends the user a message. The user can engage in a number of activities, actions and functions selected by the owner and visible as buttons that can be interacted with at 403. These functions 403 can vary from sharing the app with friends via other social networking platforms; taking photos using the smartphone's camera; taking surveys; participating in contests; or logging specific activities, actions and interests. In one embodiment, the application also displays a leaderboard at 404 depicting the profile images of users who have performed the most actions as selected by the owner. The actions can range from sharing the application, to winning a voting contest or other contest, to logging in regularly or regularly performing other actions. In one embodiment, the application can also display the user's recognition wall or activity wall at 405. Navigation buttons 406 can also be customized, selected and arranged by the owner in one embodiment. In one embodiment, an owner can create individualized sub-groups on the platform. These separate subgroups could display different actions selected by the owner at 403, and may have a different leaderboard at 404. Users can switch between these different sub-groups at will, or they could be assigned to specific sub-groups by the owner.

Figure 6:
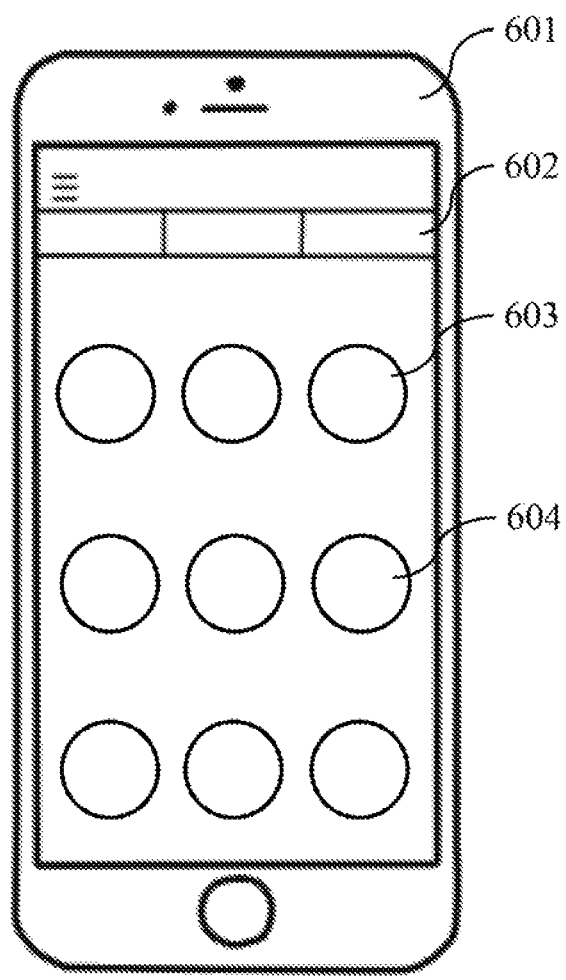
FIG. 6 is a depiction of the badge screen as seen by a member of the audience in one embodiment of the system.

FIG. 6 is an example of a custom badge page in the view layer application on a smartphone 601 in one embodiment. In one embodiment, the badges are arranged by categories 602, which correspond to whether the user has obtained those badges, or if they have not obtained them. The badges in each group are then further arranged into subcategories 603 and 604. Each badge has its own description and unique image and are selected by the owner. The owner may create new badges with new requirements and implement them in real time by updating the CMS generated at step 208 in FIG. 2. Users may then engage the platform to obtain the new badge. By engaging with the social networking platform to obtain new custom badges or to appear on the leaderboard, users participate in a Value Reinforcement System (VRS) that promotes the actions and values that the owner finds to be most valuable in the community created on the social networking platform.

Targeted Interactions Using Smart Tags

Figure 5:
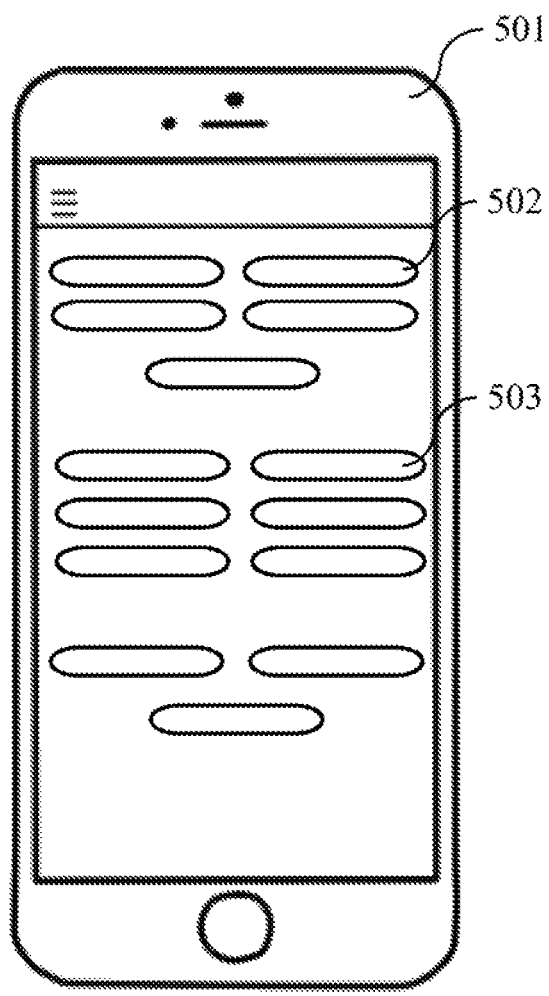
FIG. 5 is a depiction of the smart tag selection menu in one embodiment of the system.

In one embodiment of the system, the owner may interact with specific users by selecting "smart tags" that correspond with traits in sub-groups of users. An example of the smart tag selection screen in one embodiment of the system is depicted in FIG. 5. Using the application as installed on a smartphone device 501, an owner can select specific smart tags from groups of smart tags that are separated into separate categories 502 and 503. These smart tags can range from physical attributes such as gender and age, to non-physical attributes such as interests and usual time of activity. These tags can be generated automatically by the social networking platform noticing trends in the actions of users; by determining the location of users; by determining the identity of users, such as generational group; by determining the intentions of users; by determining specific interests of users; by tracking specific behaviors of users; or they can be selected by the users themselves when they register to use the social networking platform. An owner can then use these smart tags to send a message or notification to specific users who would be interested in the content of the message or notification. The users would then be notified of the targeted message or notification by the notification system 402 in FIG. 4. An owner can also use these tags to select what content a user can view on the platform, or select which sub-groups a user may join.

Embodiment of Computer Execution Environment (Hardware)

Figure 7:
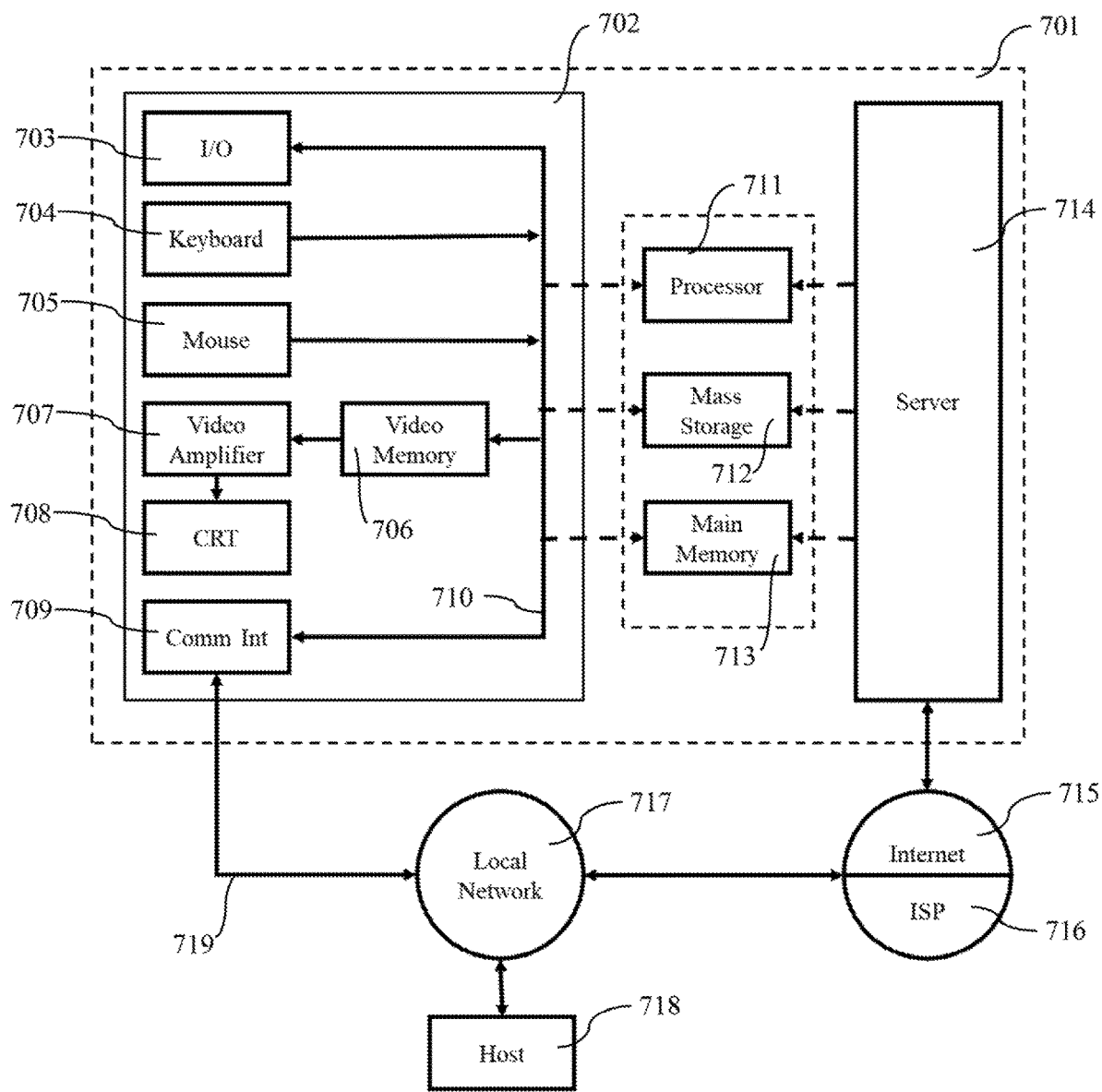
FIG. 7 is a depiction of a general purpose computing environment in one embodiment of the system.

An embodiment of the system can be implemented as computer software in the form of computer readable program code executed in a general purpose computing environment such as environment 702 illustrated in FIG. 7, or in the form of bytecodes running on a processor (or devices enabled to process bytecodes) existing in a distributed environment (e.g., one or more processors on a network). A keyboard 704 and mouse 705 are coupled to a system bus 710. The keyboard and mouse are for introducing owner input to the computer system and communicating that owner input to central processing unit (CPU 711). Other suitable input devices may be used in addition to, or in place of, the mouse 705 and keyboard 710. I/O (input/output) unit 703 coupled to bi-directional system bus 710 represents such I/O elements as a printer, A/V (audio/video) I/O, etc.

Computer 702 may be a laptop, desktop, tablet, smartphone, or other processing device and may include a communication interface 709 coupled to bus 710. Communication interface 709 provides a two-way data communication coupling via a network link 719 to a local network 717. For example, if communication interface 709 is an integrated services digital network (ISDN) card or a modem, communication interface 709 provides a data communication connection to the corresponding type of telephone line, which comprises part of network link 719. If communication interface 709 is a local area network (LAN) card, communication interface 709 provides a data communication connection via network link 719 to a compatible LAN. Wireless links are also possible. In any such implementation, communication interface 709 sends and receives electrical, electromagnetic or optical signals which carry digital data streams representing various types of information.

Network link 719 typically provides data communication through one or more networks to other data devices. For example, network link 719 may provide a connection through local network 717 to local server computer 718 or to data equipment operated by ISP 716. ISP 716 in turn provides data communication services through the world wide packet data communication network now commonly referred to as the "Internet" 715. Local network 717 and Internet 715 both use electrical, electromagnetic or optical signals which carry digital data streams. The signals through the various networks and the signals on network link 719 and through communication interface 709, which carry the digital data to and from computer 702, are exemplary forms of carrier waves transporting the information.

Processor 711 may reside wholly on client computer 702 or wholly on server 714 or processor 711 may have its computational power distributed between computer 702 and server 714. Server 714 symbolically is represented in FIG. 7 as one unit, but server 714 can also be distributed between multiple "tiers". In one embodiment, server 714 comprises a middle and back tier where application logic executes in the middle tier and persistent data is obtained in the back tier. In the case where processor 711 resides wholly on server 714, the results of the computations performed by processor 711 are transmitted to computer 702 via Internet 715, Internet Service Provider (ISP) 716, local network 717 and communication interface 719. In this way, computer 702 is able to display the results of the computation to an owner in the form of output.

Computer 702 includes a video memory 706, main memory 713 and mass storage 712, all coupled to bi-directional system bus 710 along with keyboard 704, mouse 705 and processor 711.

As with processor 711, in various computing environments, main memory 713 and mass storage 712, can reside wholly on server 714 or computer 702, or they may be distributed between the two. Examples of systems where processor 711, main memory 713, and mass storage 712 are distributed between computer 702 and server 714 include thin-client computing architectures and other personal digital assistants, Internet ready cellular phones and other Internet computing devices, and in platform independent computing environments, The mass storage 712 may include both fixed and removable media, such as magnetic, optical or magnetic optical storage systems or any other available mass storage technology. The mass storage may be implemented as a RAID array or any other suitable storage means. Bus 710 may contain, for example, thirty-two address lines for addressing video memory 706 or main memory 713. The system bus 710 also includes, for example, a 32-bit data bus for transferring data between and among the components, such as processor 711, main memory 713, video memory 706 and mass storage 712. Alternatively, multiplex data/address lines may be used instead of separate data and address lines.

In one embodiment of the system, the processor 711 is a microprocessor such as manufactured by Intel, AMD, Sun, etc. However, any other suitable microprocessor or microcomputer may be utilized, including a cloud computing solution, Main memory 713 is comprised of dynamic random access memory (DRAM). Video memory 706 is a dual-ported video random access memory. One port of the video memory 706 is coupled to video amplifier 707. The video amplifier 707 is used to drive the cathode ray tube (CRT) raster monitor 708. Video amplifier 707 is well known in the art and may be implemented by any suitable apparatus. This circuitry converts pixel data stored in video memory 706 to a raster signal suitable for use by monitor 708. Monitor 708 is a type of monitor suitable for displaying graphic images.

Computer 702 can send messages and receive data, including program code, through the network(s), network link 719, and communication interface 709. In the Internet example, remote server computer 714 might transmit a requested code for an application program through Internet 715, ISP 716, local network 717 and communication interface 709. The received code maybe executed by processor 711 as it is received, and/or stored in mass storage 712, or other non-volatile storage for later execution. The storage may be local or cloud storage. In this manner, computer 702 may obtain application code in the form of a carrier wave. Alternatively, remote server computer 714 may execute applications using processor 711, and utilize mass storage 712, and/or video memory 706. The results of the execution at server 714 are then transmitted through Internet 715, ISP 716, local network 717 and communication interface 709. In this example, computer 702 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. In other embodiments, the system may be implemented on any suitable computing environment including personal computing devices, smart-phones, pad computers, and the like. An embodiment of the system may be implemented in any type of computer system or programming or processing environment.

Thus, a method and apparatus for creating customizable social platforms has been described.

What is claimed is:

1. A computer implemented method of creating a social networking platform comprising:
    selecting modular features from a plurality of modular features;
    automatically generating, based on the plurality of modular features, a server backend for hosting the social networking platform, wherein automatically generating further comprises:
        generating an application programming interface (API), a persistent data store, a media storage, and a communication protocol for the social networking platform;
        setting up software to access the media storage of the social networking platform;
        configuring metric software and domain name server (DNS) records used to access the server backend;
        generating a content management system (CMS) of the social networking platform; and
        populating the social networking platform with content;
    automatically generating, using the plurality of modular features and the content as a basis, a front-end application for use with the social networking platform, wherein the front-end application is further concurrently generated in a plurality of programming languages associated with a plurality of app stores;
    automatically compiling the front-end application in the plurality of programming languages; and
    releasing, for use with the social networking platform, the front-end application in the plurality of app stores.

2. The computer implemented method of claim 1 wherein the modular features include actions and activities that are placed on a main page of the front-end application.

3. The computer implemented method of claim 1 further comprising:
    selecting a set of actions to feature on a front page of the front-end application;
    creating badges tied to performing the set of actions;
    awarding ones of the badges to users of the social networking platform for performing ones of the set of actions.

4. The computer implemented method of claim 3 further comprising:
    displaying users who performed a threshold number of featured actions on a leaderboard.

5. The computer implemented method of claim 3 further comprising:
    creating subgroups that feature different actions, in the set of actions, on the front page of the front-end application.

6. The computer implemented method of claim 5 wherein the users able to access the subgroups are selected by a platform owner.

7. The computer implemented method of claim 5, further comprising:
    labeling the users of the social networking platform with a number of tags that describe attributes of the users;
    wherein ones of the users able to access the subgroups are selected based on the ones of the number of tags associated with the ones of the users.

8. The computer implemented method of claim 7, wherein the ones of the number of tags are based on specific attributes provided by a user when the user registers to use the social networking platform, and further wherein the ones of the number of tags are dynamically generated based on attributes of the user as the user uses the platform.

9. The computer implemented method of claim 1 further comprising:
    labeling users of the social networking platform with a number of tags that describe attributes of the users;
    selecting specific tags, from the number of tags, corresponding to selected ones of the users that an owner of the social networking platform wishes to target;
    sending targeted content to the selected ones of the users that are associated with said specific tags.

10. The computer implemented method of claim 9, wherein the specific tags are based on specific attributes provided by a user when the user registers to use the social networking platform, and further wherein the specific tags are dynamically generated based on attributes of the user as the user uses the platform.

11. The computer implemented method of claim 9, wherein the targeted content comprises messages.

* * * * *